2,915,542

PREPARATION OF DIMETHYLALUMINUM HYDRIDE

Robert E. Robinson, Springfield Township, Hamilton County, and Ervin G. Pritchett, Cincinnati, Ohio, assignors to National Distillers and Chemical Corporation, New York, N.Y., a corporation of Virginia No Drawing. Application February 4, 1958
Serial No. 713,101

6 Claims. (Cl. 260—448)

The present invention relates to a method for preparation of dimethylaluminum hydride and, more particularly, for preparation of dimethylaluminum hydride by reaction between an appropriate dimethylaluminum halide and an alkali metal hydride prepared by hydrogenation of an alkali metal in the presence of a defined amount of methyl borate.

In accordance with this invention, improved results are obtained in the preparation of dimethylaluminum hydride by use as a reactant of a dispersion of the alkali metal hydride in an inert liquid if, in the preparation of the alkali metal hydride by hydrogenating an alkali metal, there is present during the hydrogenation an amount of from about two to about five percent, and preferably about three to about four percent, based on the weight of the alkali metal, of methyl borate. Thus, the methyl borate can be added to an alkali metal in an inert liquid prior to or during formation of the alkali metal hydride.

For the reaction involving the alkali metal hydride to form a dimethylaluminum hydride there can be used dimethylaluminum-chloride or -bromide. The temperature employed is from about 0° C. up to the boiling point of the dimethylaluminum halide which, in the case of dimethylaluminum chloride, is about 130° C., with a preferred temperature for the reaction being from about 35° to about 50° C. However, if carrying out of the reaction under pressure is desired, higher operating temperatures may be used. The time period employed for carrying out the reaction is, in general, from about fifteen minutes to about three hours with a preferred time period being from about 35 minutes to about two hours.

The ratio of reactants, i.e., the dimethylaluminum halide and alkali metal hydride, should be as near equimolar as is practical in order to avoid undesirable side reactions as (1) a substantial excess of alkali metal hydride generally results in formation of alkali metal-aluminum dimethyldihydride and (2) a substantial excess of the dimethylaluminum halide generally results in contamination therewith of the product dimethylaluminum hydride.

As aforesaid, an important aspect of this invention is the use of an alkali metal hydride reactant that is prepared in the presence of the aforedefined amount of methyl borate by hydrogenation of the appropriate alkali metal under conditions to form the alkali metal hydrides. The preparation of the alkali metal hydride is suitably carried out in an inert liquid such as a liquid hydrocarbon although other substances such as ethers and tertiary amines, etc. may be used. Hydrocarbons are preferred, however, as substances such as ethers and amines complex with the dimethylaluminum hydride to form etherates or amine complexes which necessitates additional processing to recover the free dimethylaluminum hydride.

Specific examples of such inert liquids include pentane, heptane, toluene, mineral spirits, decalin, kerosenes, mineral oils, butyl ether, tetrahydrofuran, diethyl ether of ethylene glycol, N-methylmorpholine, dimethylaniline, etc. In general, the alkali metal hydride reactant, when used in an inert liquid, is employed as a dispersion of from about 5 to about 25% by weight of the alkali metal hydride in the inert liquid with more preferred concentrations being from about 8 to about 17%. Concentrations above about 25%, though they may be operable, are generally not used as they generally inhibit completion of the desired reaction.

The preparation of the alkali metal hydride by hydrogenation of the appropriate alkali metal may be prepared by any of several methods known to the art for such preparations as long as, as embodied herein, there is present during the hydrogenation the aforesaid proportional amount of methyl borate. Thus, sodium hydride can be prepared as a suspension in mineral oil by treating a sodium dispersion with hydrogen gas at about 190 to 325° C. in accordance with the equation $$H_2 + 2Na \rightarrow 2NaH$$

For purposes of further illustration, using the preparation of sodium hydride as an example, the following procedure is set forth and which is the procedure employed in preparing the sodium hydride reactant utilized in the specific embodiments of the invention set forth hereinafter in the tabulation and use of such a reactant for preparation of dimethyl aluminum hydride.

To a 5 to 25% suspension of sodium in a mineral oil there was added 3–4% of methyl borate (based on sodium) and heated to 280–300° C. Hydrogen was then passed into the stirred mixture at 280–320° C. at a rate sufficient to maintain the reaction under control and until no further hydrogen absorption occurred. While stirring the resulting hydride in mineral oil in an argon-blanketed flask, dimethylaluminum chloride was added at a rate sufficient to maintain the desired reaction temperature. When the addition of dimethylaluminum chloride was complete, the mixture was stirred for an additional period of time to allow completion of reaction. The product was then distilled under 1 mm. vacuum to provide a distillate comprising dimethylaluminum hydride and unreacted dimethylaluminum chloride. Additional reaction conditions are set forth in the tabulation set forth hereinafter.

In order to further describe the invention, the following tabulation sets forth runs made with the use of methyl borate as embodied herein as well as, for comparison purposes, a run made with use of methyl borate in an amount less than sufficient for practice of this invention. For the examples shown, the sodium hydride reactant was used an an 8–17% concentrate in white oil prepared by the method aforedescribed. In the tabulation, the data shown for the yield of dimethylaluminum hydride is the percent, based on sodium hydride, of dimethylaluminum hydride isolated by distillation from the mineral oil slurry (reaction product) under reduced pressure (5 mm.). The resulting distillate was then analyzed for chloride content by injecting a sample into a stoppered, argon-blanketed, tarred flask containing mineral oil, treating the resulting mixture with water and analyzing the aqueous phase for chloride ion by conventional methods. To obtain the substantially pure dimethylaluminum hydride, the distillate was stirred for several minutes with an excess of sodium hydride and the product redistilled.

| Run No. | Dimethyl aluminum chloride (moles) | NaH in white oil — Sodium hydride, moles | NaH in white oil — Percent | Methyl borate (percent based on Na) | Reaction conditions — Time (min.) | Reaction conditions — Temp., °C. | Reaction conditions — Final stirring Time (min.) | Reaction conditions — Avg. temp., °C. | Yield of total product as percent Me₂AlH | Percent Me₂AlH in product | Percent Me₂AlCl in product | Actual yield, percent, Me₂AlH | Remarks |
|---|---|---|---|---|---|---|---|---|---|---|---|---|---|
| 1 | 3.69 | 3.69 | 12.4 | 1.7 | 35 | 40 | 90 | 40 | 89 | 75.1 | 24.9 | 67 | Chloride content of product high, due to insufficient methyl borate. |
| 2 | 3.95 | 3.95 | 15.2 | 4.0 | 40 | 40 | 80 | 30 | 84 | 99.2 | 0.8 | 83 | High yield of dimethylaluminum hydride of exceptionally low chloride content. |
| 3 | 1.29 | 1.29 | 13.2 | 3.8 | 35 | 45 | 90 | 30 | 75 | 98.7 | 1.3 | 74 | Substantial yields of dimethylaluminum hydride of exceptionally low chloride content. |

As is apparent from the foregoing tabulation, high yields, of dimethylaluminum hydride of exceptionally low chloride content resulted from practice of this invention as per the results shown for run Nos. 2 and 3 whereas, as shown by the data for run No. 1, product of high chloride content was obtained when an insufficient amount of methyl borate was used during preparation of the sodium hydride.

The present process provides markedly improved results over preparations of dimethylaluminum hydride by reacting dimethylaluminum chloride with sodium hydride prepared in absence of methyl borate. Although such a reaction with use of the hydride reactant prepared in absence of the borate may result in relatively high yields of recovered total product dimethylaluminum hydride and unreacted dimethylaluminum chloride, the product therefrom is generally contaminated with large amounts of chloride (e.g., 12–33%) but, additionally, difficulties are generally encountered in carrying out the reaction to substantial completion due to the decided tendency of the reaction bed to cake during the early stages of the reactant additions whereby contact between the reactants is inhibited following the early stages of the reaction.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A method for preparation of dimethylaluminum hydride which comprises reacting a dimethylaluminum halide from the group consisting of dimethylaluminum chloride and dimethylaluminum bromide with an alkali metal hydride dispersed in an inert liquid, which dispersion has been prepared by hydrogenation of an alkali metal in an inert liquid in presence of from about two to about five percent by weight, based on the alkali metal, of methyl borate.

2. A method, as defined in claim 1, wherein the reaction of the alkali metal hydride and dimethylaluminum halide is carried out at a temperature of from about 0° C. up to the boiling point of the dimethylaluminum halide.

3. A method, as defined in claim 2, wherein the reaction is carried out for a time period of from about fifteen minutes to about three hours.

4. A method, as defined in claim 1, wherein the reaction is carried out with substantially equimolar amounts of the dimethylaluminum halide and alkali metal hydride.

5. A process for preparation of dimethylaluminum hydride which comprises reacting dimethylaluminum chloride with a substantially equimolar amount of sodium hydride dispersed in an inert liquid, which dispersion has been prepared by hydrogenating sodium in an inert liquid in presence of from about two to about five percent by weight, based on the sodium, of methyl borate.

6. A process, as defined in claim 5, wherein the reaction of the dimethylaluminum chloride with sodium hydride is carried out at from about 35 to about 50° C. for a period of from about fifteen minutes to about three hours.

No references cited.